Dec. 11, 1923.

O. G. POUCH 1,477,149

CONTROL PANEL FOR HEATING EQUIPMENT

Filed March 22, 1921   2 Sheets-Sheet 2

Inventor:-
Oscar G. Pouch
by attorneys
Brown & Seward

Patented Dec. 11, 1923.

1,477,149

UNITED STATES PATENT OFFICE.

OSCAR G. POUCH, OF NEW YORK, N. Y.

CONTROL PANEL FOR HEATING EQUIPMENT.

Application filed March 22, 1921. Serial No. 454,546.

*To all whom it may concern:*

Be it known that I, OSCAR G. POUCH, a citizen of the United States, and resident of the borough of Richmond, in the city and State of New York, have invented a new and useful Improvement in Control Panels for Heating Equipment, of which the following is a specification.

The object of my invention is to provide a novel apparatus for automatically maintaining the temperature in a confined space or in a plurality of confined spaces between predetermined limits, said apparatus including heating means, an electric thermostat and thermostat controlled means for opening and closing the main line circuit through the heating means.

My invention more particularly includes a control panel provided with a thermostat and an electro-magnet controlled thereby for opening and closing the main line circuit through a heater or a plurality of heaters, a relay for the electro-magnet being preferably provided on the panel, the panel being also provided with a normally closed manually operated switch in the main line and a normally open manually operated switch arranged, when closed, to cut out the automatic control and to connect the main line and heater circuits.

My invention is shown in connection with a sprinkler system for fire protection of that type in which the valve house has located therein the valve which is the controlling feature between that portion of the sprinkler system which is filled with compressed air and that portion of the system which is filled with water, the air pressure being immediately relieved when the automatic head is opened by an excess of heat beyond a predetermined point, thus causing the control valve to operate for allowing the water to go into that portion of the sprinkler system which was formerly filled with air, for use in extinguishing the fire. It is therefore very essential to keep this valve house at a substantially even temperature, above freezing, to keep the sprinkler system in working order.

Figure 1:
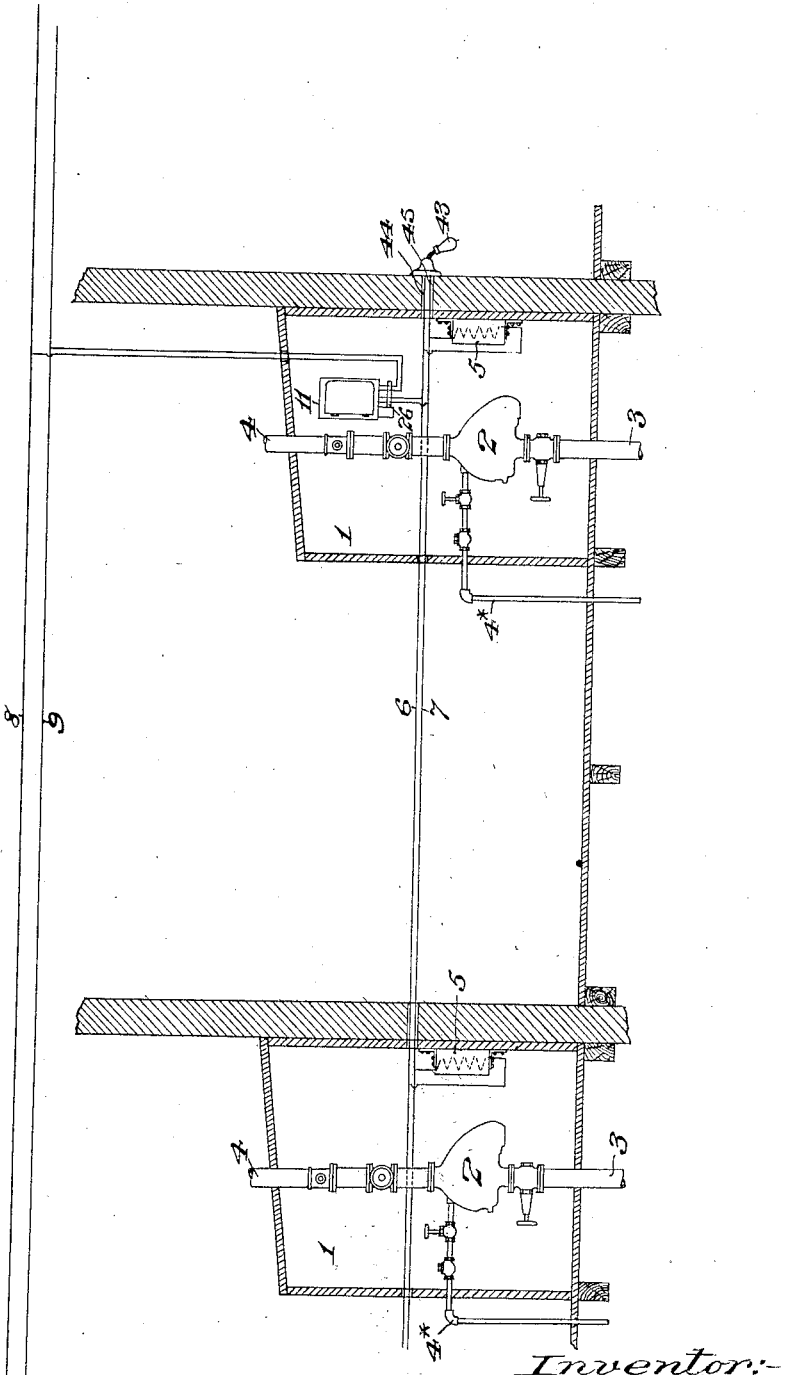

A practical embodiment of my invention is represented in the accompanying drawings, in which, Fig. 1 represents in diagram, two valve houses of a sprinkler system for fire protection, with my invention applied thereto.

Figure 2:
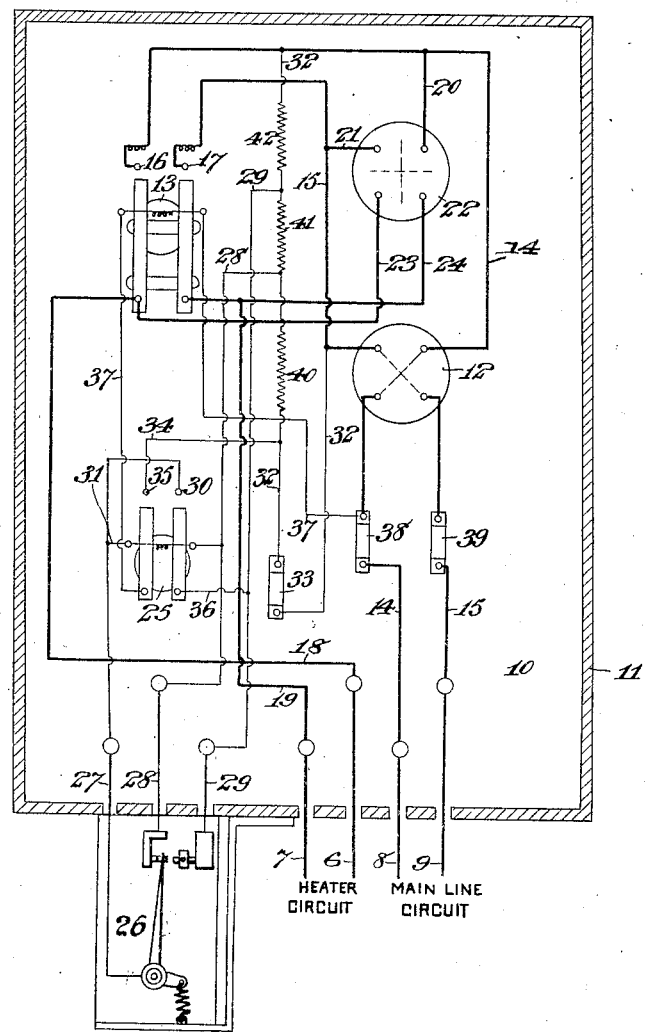

Fig. 2 represents a detail diagrammatic view of my improved control panel.

The two rooms or valve houses are denoted by 1, in each of which is illustrated diagrammatically the control valve 2 of the sprinkler system, to which valve leads the water supply pipe 3 and from which valve leads the sprinkler pipe 4 which is normally filled with compressed air. The compressed air line is denoted by 4*.

In each of these valve houses I provide a suitable electric heater 5 which heaters are connected up to the wires 6 and 7 of the heater line circuit.

The main line circuit wires are denoted by 8 and 9 respectively.

In one of the valve houses I locate my improved panel 10 in a suitable box 11 for protection. A normally closed manually operated switch 12 is located in the main line circuit, and it is mounted on the panel 10. An electro-magnet 13, of any well known or approved type is mounted on the panel and it is arranged to make and break the connection between the main line and heater circuits as the magnet is energized and deenergized. Extensions 14, 15 of the main line circuit wires 8, 9, lead through the normally closed manually operated switch 12 to the contact points 16, 17 of the electro-magnet 13. Extensions 18, 19 of the heater line circuit wires 6, 7 lead to the armature of the electro-magnet 13. Extensions 20, 21 of the main line wire, extensions 14, 15 and extensions 23, 24 lead from the heater line circuit, extensions 18, 19, all lead to the normally open manually operated switch 22.

A relay 25 for the magnet 13 is also mounted on the panel.

An electric thermostat of any well known or approved form, denoted by 26 is located in the valve house outside of the box 11. This thermostat is arranged to automatically control the operation of the relay 25 and thereby the electro-magnet 13 to break the connection between the heater line circuit and the main line circuit when the temperature in the valve house rises to a predetermined limit and to make the connection between the main line circuit and the heater line circuit when the temperature in the valve house drops to a predetermined limit.

A common control wire 27, a high temperature control wire 28 and a low temperature control wire 29, all lead from the thermostat 26; the common control wire 27 leading to the contact 30 of the relay 25. A branch 31 of this wire 27 leads through the coil of the relay to the high temperature control wire 28. This wire 28 leads to a wire 32, which wire 32 leads from the main line circuit wire 14 through a fuse 33 to the main line circuit wire 15. A branch wire 34 leads from the wire 32 to the contact 35 of the relay 25. The low pressure control wire 29 also leads to the wire 32. A branch 36 of this wire 29 leads to the armature of the relay 25. A wire 37 leads from the armature of the relay 25 through the coil of the electro-magnet 13 and from thence to the main line circuit wire 14. Fuses 38, 39 may be provided in the main line circuit extension wires 14, 15. These wires leading from the thermostat to the relay and electro-magnet permit the thermostat to control the operation of the relay and electro-magnet, whereby the fall of the temperature in the valve house to a predetermined limit will cause the movable element of the thermostat to complete the circuit through the coil of the relay 25, by connecting the common control wire 27 with the low pressure control wire 29, causing its armature to complete the circuit through the coil of the electro-magnet 13 to energize the same and cause its armature to close communication between the main line circuit and the heater line circuit. When the temperature in the valve house has risen to a predetermined limit, the movable element of the thermostat will break the circuit through the coil of the relay 25, by connecting the common control wire 27 with the high pressure control wire 28, thereby de-energizing the same which will cause its armature to break the circuit through the coil of the electro-magnet, thus causing its armature to break the connection between the main line circuit and the heater line circuit.

If it be desired to cut out the automatic control, the normally open switch 22 may be closed, thereby closing communication between the main line circuit and the heater line circuit.

A resistance 40, 41, 42 is provided in the wire 32. The wire 28 leads to the wire 32 between the resistance elements 40, 41, and the wire 29 leads to the wire 32 between the resistance elements 41, 42. The wire 34 leads to the wire 32 between the fuse 33 and resistance element 40.

If so desired a tell-tale signal may be connected to the heater circuit, said signal being located where attention thereto may be readily attracted, to indicate whether the heater circuit is closed or open. In the present instance I have illustrated a lamp 43 located where it may be easily observed and having its circuit wires 44, 45 connected to the heater line circuit wires 6, 7. When the heaters are in operation the lamp will be lighted and when the heaters are not in operation the lamp will be extinguished.

From the above description it will be seen that my improved panel can be readily adapted for use in connection with heating equipments of various kinds, the single panel being adapted to control the heaters in one or more confined spaces as may be required.

It is evident that various changes may be resorted to in the construction, form and arrangement of the several parts without departing from the spirit and scope of my invention; hence I do not wish to limit myself to the particular construction herein shown and described, but

What I claim is:—

1. In a temperature regulating apparatus, a main line circuit, an electric heater, a heater line circuit, an electro-magnet, a relay therefor and a thermostat arranged to automatically control the operation of the relay and thereby the electro-magnet, to break the connection between the main and heater line circuits when the temperature falls to a predetermined point and to make the connection when the temperature rises to a predetermined point.

2. In a temperature regulating apparatus, a main line circuit, an electric heater, a heater line circuit, an electro-magnet, a relay therefor, a thermostat arranged to automatically control the operation of the relay and thereby the electro-magnet, to break the connection between the main and heater line circuits when the temperature falls to a predetermined point and to make the connection when the temperature rises to a predetermined point, and a normally closed manually operated switch for the main line circuit.

3. In a temperature regulating apparatus, a main line circuit, an electric heater, a heater line circuit, an electro-magnet, a relay therefor, a thermostat arranged to automatically control the operation of the relay and thereby the electro-magnet, to break the connection between the main and heater line circuits when the temperature falls to a predetermined point and to make the connection when the temperature rises to a predetermined point, a normally closed manually operated switch for the main line circuit, and a normally open manually operated switch arranged when closed to connect the main line and heater line circuits and cut out the electro-magnet, relay and thermostat.

4. In a temperature regulating apparatus, a control panel provided with main line circuit wires, heater line circuit wires, an electro-magnet, a relay therefor, and a thermostat arranged to automatically control the operation of the relay and thereby the electro-magnet, to break the connection between the main line and heater line circuit wires when the temperature falls to a predetermined point and to make the connection when the temperature rises to a predetermined point.

5. In a temperature regulating apparatus, a control panel provided with main line circuit wires, heater line circuit wires, an electro-magnet, a relay therefor, a thermostat arranged to automatically control the operation of the relay and thereby the electro-magnet, to break the connection between the main line and heater line circuit wires when the temperature falls to a predetermined point and to make the connection when the temperature rises to a predetermined point, and a normally closed manually operated switch for the main line circuit wires.

6. In a temperature regulating apparatus, a control panel provided with main line circuit wires, heater line circuit wires, an electro-magnet, a relay therefor, a thermostat arranged to automatically control the operation of the relay and thereby the electro-magnet, to break the connection between the main line and heater line circuit wires when the temperature falls to a predetermined point and to make the connection when the temperature rises to a predetermined point, a normally closed manually operated switch for the main line circuit wires, and a normally open manually operated switch arranged when closed to connect the main line and heater line circuit wires and to cut out the electro-magnet, relay and thermostat.

7. Means for maintaining the temperature in a plurality of rooms between predetermined limits comprising a main line circuit, an electric heater in each of said rooms, an electro-magnet, a relay and a thermostat, all located in one of said rooms, said relay being automatically controlled by the thermostat for deenergizing and energizing the electro-magnet to open and close the circuit through said heaters.

8. Means for maintaining the temperature in a plurality of rooms between predetermined limits comprising a main line circuit, an electric heater in each of said rooms, an electro-magnet, a relay, a thermostat, all located in one of said rooms, said relay being automatically controlled by the thermostat for deenergizing and energizing the electro-magnet to open and close the circuit through said heaters, and a normally closed manually operated switch for the main line circuit.

9. Means for maintaining the temperature in a plurality of rooms between predetermined limits comprising a main line circuit, an electric heater in each of said rooms, an electro-magnet, a relay, a thermostat, all located in one of said rooms, said relay being automatically controlled by the thermostat for deenergizing and energizing the electro-magnet to open and close the circuit through said heaters, a normally closed manually operated switch for the main line circuit, and a normally open switch manually operable at pleasure to cut out the automatic control and to close the circuit through said heaters.

In testimony, that I claim the foregoing as my invention, I have signed my name this 15th day of March, 1921.

OSCAR G. POUCH.